United States Patent [19]

Umezawa et al.

[11] 3,856,969

[45] Dec. 24, 1974

[54] KASUGAMYCIN AS A PLANT DISEASE PREVENTIVE AGENT

[75] Inventors: Hamao Umezawa; Yoshiro Okami; Tomio Takeuchi, all of Tokyo; Tetsuji Ishiyama, Kanagawa-ken, all of Japan

[73] Assignee: Zaidan Hojin Biseibutsu Kagaku Kenkyukai (Microbial Chemistry Research Foundation), Tokyo, Japan

[22] Filed: Mar. 3, 1965

[21] Appl. No.: 436,846

[30] Foreign Application Priority Data
June 23, 1964 Japan.............................. 39-35307
June 26, 1964 Japan.............................. 39-36028

[52] U.S. Cl. ............................................. 424/283
[51] Int. Cl............................................. A61k 21/00

[58] Field of Search............... 167/30 A, 30 F, 22 E; 424/283

[56] References Cited
UNITED STATES PATENTS
3,358,001  12/1967  Umezawa et al............. 167/65 AB

*Primary Examiner*—Jerome D. Goldberg
*Attorney, Agent, or Firm*—Mason, Fenwick & Lawrence

[57] ABSTRACT

A crop disease preventive agent which may be kasugamycin or its addition, acid salts alone, or in the ratio of 1–1000 to 1–20 of a conventional fungicide such as phenyl mercury acetate, phenyl mercury iodide, blasticidin S, hexadecylthiocyanate and octadecylthiocyanate.

4 Claims, 2 Drawing Figures

KASUGAMYCIN AS A PLANT DISEASE PREVENTIVE AGENT

This invention relates to a new preventive agent of plant diseases selected from those which contain kasugamycin or its acid addition salts with or without diluent and a surface active agent or which contain kasugamicin or its addition salts together with other active agents and which give marked effects against crop diseases, particularly rice blast, and to their use for prevention of plant diseases.

Figure 1:
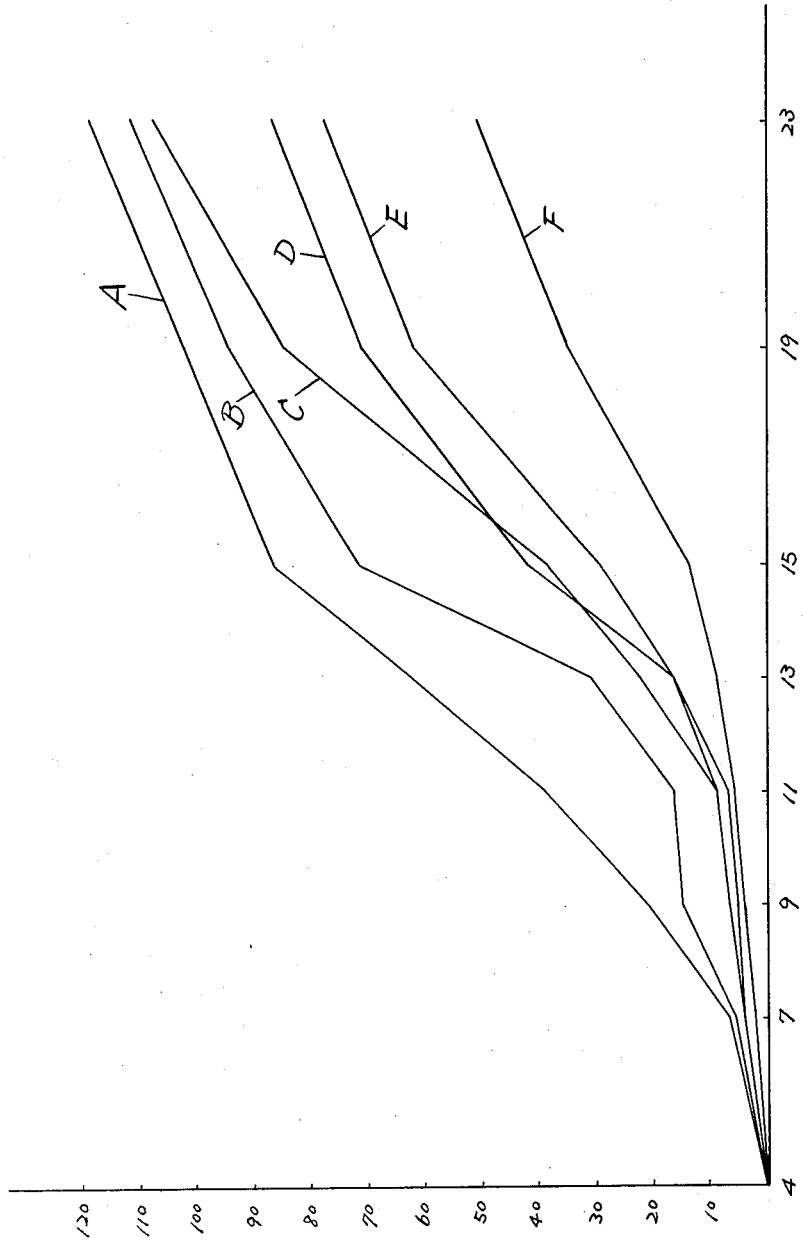
Figure 2:
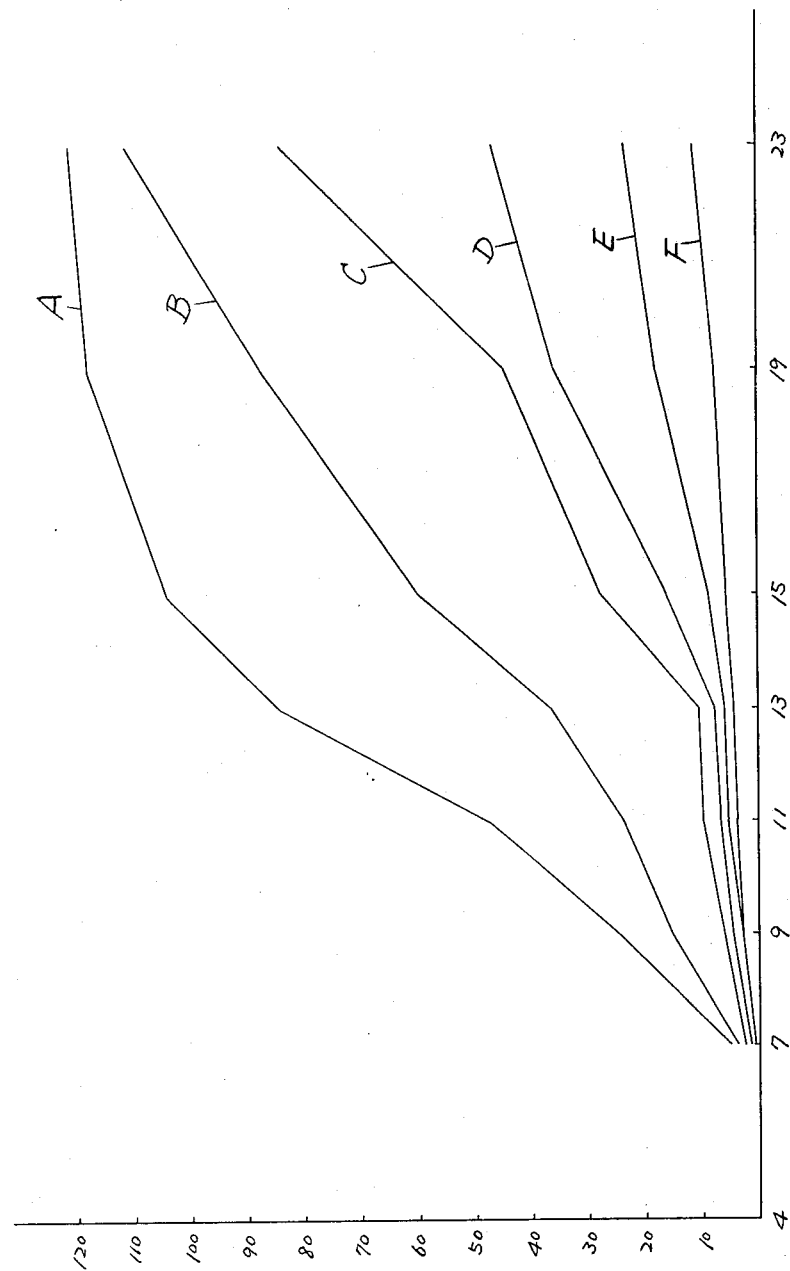

In the accompanying drawings, FIGS. 1 and 2 show curves indicating respective preventive effects of kasugamycin and of other known chemicals against rice blast.

Conventionally, organic mercury compounds and blasticidin S have been used as preventive agents against rice blast. Since rice blast causes serious damages to rice, more effective agents have been required. When used for long period, the organic mercury compounds tend to remain in the human body and hence the amount thereof is required to be reduced. Further, blasticidin S has a strong toxicity, causing destruction of human mucous membrane. In this connection, the appearance of new active agents against rice blast has been desired.

Kasugamycin is a novel antibiotic discovered by Hamao Umezawa et al., the present inventors, and showed excellent preventive effects against rice blast as compared with known agents not only in pot tests in a green house but also in field tests. Even when used in admixture with known preventive agents, such as organic mercury compounds, higher alkylthiocyanates, particularly hexadecyl and octadecyl thiocyanate, blasticidin S, it is not deteriorated in effect, but rather enhanced. Kasugamycin is harmless to men, animals and fishes. It is harmless to plants giving no toxic sign, even when used in an amount 100 times higher than the useful concentration. The properties of kasugamycin are described in detail in U.S. Pat. application Ser. No. 412,168 filed Nov. 18, 1964, now abandoned, (wherein is given a statement concerning the fact that kasugamycin cultures M338-Ml and M338–Ml–U2 have been deposited in the American Type Culture Collection, Washington under ATCC 15714 and 15715, respectively) together with the production process thereof, and can be summarized as follows:

Kasugamycin is basic, has pK' a value of about 7.1 and forms acid addition salts with inorganic or organic acids. It is water-soluble but is practically insoluble in organic solvents. In the range of 220 to 350 m$\mu$ in the ultraviolet spectrum, it does not show any maximum absorption except end absorption. Its hydrochloride is obtained as white crystals showing a decomposition point of about 202°C. – 204°C. which are optically active and exhibit a specific rotation of $(\alpha)_D^{22} + 120°$ (in 1.6% aqueous solution). The hydrochloride crystals showed a molecular weight of about 543 and indicated the presence of 1 mol. of water of crystallization when subjected to Karl Fischer test. From the elementary analysis, it was found that the molecular formula thereof is $C_{15}H_{27}N_3O_{10} \cdot H_2O \cdot HCl$. The hydrochloride crystals were dried at 150°C. and were then subjected to elementary analysis to obtain the values of C: 38.58, H: 6.72, O: 37.05, N: 9.66 and Cl: 8.16. Kasugamycin is positive in ninhydrin reaction (with pyridine) and potassium periodate-permanganate reaction, and is negative in Molisch, Tollens, Elson-Morgan, Sakaguchi, Fehling and ferric chloride reactions. On a peptone-meat extract-agar medium, it inhibits *Corynebacterium xerosis* at a concentration of 50 mg/cc. Streptococcus at 100 mg/cc., *Proteus vulgaris* at 100 mcg/cc., strains of Dysentery bacteria and Salmonella at 100 mcg/cc., and *Brusella melitensis* at 6.25 mcg/cc. However, other microorganisms tested were not inhibited even at 100 mcg/cc. Kasugaycin shows stronger antimicrobial actions in Stephenson-Wetham synthetic medium than in a peptone-meat extract medium. It inhibits Pseudomonaceae at 6.25 – 50 mcg/cc. in peptone water. It does not inhibit *Piricularia oryzae* on Sabouraud's medium at 100 mcg/cc. but inhibits this organism at 0.1 – 1.0 mcg/cc. in a medium consisting of rice juice and agar adjusted to pH 4.0. The intravenous injection of 1000 mg/kg. to a mouse shows no toxicity. Even when it is daily given to mice by intramuseular injection for 10 days, 1000 mg/kg. per day causes no toxicity. Further, even when it is daily given to a dog or monkey by subcutaneous injection of 500 mg/kg. no toxicity is observed in liver, kidney and hematopoetic organs. Kasugamycin is purified according to ion exchange process, or by treatment with active carbon.

A characteristic of kasugamycin is to give strong preventive effects against rice blast, and to have markedly low toxicity to human, animals and plants. For example, a test carried out by spraying an aqueous solution of Kasugamycin to rice seedlings in 3 leaf age infected with *Piricularia oryzae* showed such results that kasugamycin showed effect of 55% inhibition of the leaf lesions at a concentration of 1.25 mcg/cc., 73% at 5 mcg/cc., and 100% at 10 mcg/cc. Even when sprayed at a concentration of 1 mg/cc., the solution showed no phytotoxicity. Kasugamycin displays its strong preventive effect against rice blast not only on leaves but also against that on ears. For example, a test conducted by spraying the solution of kasugamycin at a concentration of 40 mcg/cc. to rice plants, two days after the infection of *Piricularia oryzal* showed that rice blast on ears, stem-nodes and grains was completely controlled. Further, the spray of the solution at a concentration of 1.25 – 20 mcg/cc. obviously showed preventive effect. On the other hand, a solution of blasticidin S showed pytotoxicity when the concentration was higher than 20 mcg/cc. and no complete prevention was observed. If on the basis of antimicrobial effects and of the low toxicity kasugamicin is tested for the effect against various plant diseases, it is natural that the effective area of kasugamycin become broader. According to tests in a green house, kasugamycin exhibited preventive effect against rust of wheat and against wild fire of tabacco plants.

Although its action mechanism is not clear, kasugamycin shows stronger preventive effect when a solution thereof is sprayed on plants after the infection than before the infection. Ordinarily, the former effect is called as the curative effect while the latter as the protective effect. In the case of kasugamycin, the curative effect is shown stronger than the protective effect. Further, kasugamycin is excellent in rain-resistant property. For example, in a test carried out by spraying solutions of kasugamycin to plants 2 days after the infection of *Piricularia oryzae*, water shower was given to the plants 30 minutes after the spray and then after 7 days in a green house, the number of enlarged lesion were calculated. In the case of kasugamycin at a concentration of 10 mcg/cc., the number of enlarged lesion per each leaf was 2.2, wherein that was 4.8 in the case of blasticidin S at 10 mcg/cc. (control showed 36.9). In order to know preventive effects against damage due to rice blast, it is also useful to investigate the effect on outcome of new healthy leaves after infection and the treatment. In this test kasugamycin showed excellent results as compared with blasticidin S.

Kasugamycin or its acid addition salts, either in pure or crude form, displays preventive effect. Even a cultured liquid containing kasugamycin, either as such or in a condensed or dried state, exhibits preventive effects as well. Simultaneously with kasugamycin, *Streptomyces kasugaensis* sometimes produces aureothricin, thiolutin and a pentaene antifungal substance. Usually these antibiotics in the cultured broth show no harmful effect at the dilution at which kasugamycin is effectively used.

In accordance with the present invention, it is possible to use pure or crude kasugamycin or its acid addition salts, a kasugamycin-containing culture-liquid, the dried culture-liquid or a crude extract of kasugamycin with or without diluents and surface active agents for prevention of plant diseases. In case of using a kasugamycin-containing culture-liquid, its filtrate or dried culture-liquid, or kasugamycin-containing extract is used, other incorporated antibiotics are removed, if necessary.

Kasugamycin has been clarified in physico-chemical properties and antimicrobial effect, and therefore the present invention involves all kasugamycin-containing agent useful for prevention of plant diseases. Kasugamycin can be used, without being interfered in the effect, in combination with a conventional mercury preparation, blasticidin S or alkylthiocyanates particularly hexadecyl and octadecylthiocyanate. Such combined use can serve to make the antimicrobial spectrum of kasugamycin broader. The present invention involves the combined agents as well.

According to the present invention, an agent containing kasugamycin can be formed, by conventional process applied to preparation of ordinary agricultural pesticides, into a suitable form such as for example dust, liquid, emulsiable liquid or wettable powder. A dust formulation is obtained by mixing kasugamycin or a kasugamycin-containing material with a solid carrier such as calcium carbonate, gypsum, clay, talc, sieklite, vermiculite, diatomaceous earth, etc.; a wettable powder by mixing the same with, for example, a solid carrier and a surface active agent; a liquid formulation by adding the same to water or methanol or organic solvents-containing water; and an emulsifiable liquid formulation by emulsifying the same with the addition of a surface active agent. If necessary, a spreader and a stabilizer may further be added. Kasugamycin is stable under neutral, weakly acidic and acid conditions but is less stable under alkaline conditions and hence is desirably formulated into a neutral or acidic state. Further, kasugamycin is basic, so that it is necessary to take into consideration the case where it is adsorbed with an acidic solid. The dust, liquid, emulsiable liquid and wettable powder formulations can be prepared in combination with conventional fungicides, e.g. organic mercury compounds, blasticidin S, and alkylthiocyanates, particularly hexadecyl and octadecyl thiocyanate discovered by Tetsuji Ishiyama et al., one of the present inventors.

As kasugamycin has been clarified in properties as well as in biological activities, it is easy to make modification of the present invention. The present invention is not limited to the examples shown below but involves all chemicals containing kasugamycin.

Preventive effects of kasugamycin against rice blast have been detailed and established and the use thereof will be enlarged, when kasugamycin is marketed. For example, the preventive effect of kasugamycin against rust of wheat and wild fire of tobacco was observed. The present invention relates to agricultural pesticides for preventing and curing crop diseases, and the use thereof is not limited only to the prevention and cure of rice blast.

METHOD 1

Test on curative effect.

The test was carried out according to pot test method. Rice plant tested was mongolian variety seedlings in 3 leaf age. Each 20 rice grains just before germination were sawed in each of pots of 9 cm. in diameter. At the stage of 3 leaf age, spore suspension of *Piricularia oryzae* was inoculated to the seedlings. The inoculated seedlings were kept in a moist chamber for 20 hours and then a solution of each chemical tested was sprayed thereto under a pressure of 0.5 kg./cm$^2$ in an amount of 4 ml/pot. To each chemical, 100 mcg/cc. of Newcol-560 was added as a spreader. The seedlings were allowed to stand in a green house for 5 – 7 days and then the number of enlarged lesions per 10 leaves was calculated. The curative value was evaluated by the following formula:

$$C.V. = \frac{\text{Number of lesions untreated} - \text{number of lesions treated}}{\text{Number of lesions untreated}} \times 100$$

METHOD 2

Pot test on protective effect.

The procedures were the same as in the method (1), but rice seedlings were treated with chemicals before the inoculation of *Piricularia oryzae*.

The protective value was similarly evaluated as the curative value.

EXAMPLE 1

In this example, the method (1) was adopted, a filtrate of cultured liquid of *Streptomyces kasugaensis* which contained about 200 mcg/cc. of kasugamycin was extracted with butanol to remove aureothricin, thiolutine and a pentaen antifungal substance. The filtrate was diluted with distilled water to 2, 4, 8 and 16 times, and, to each of the diluted filtrate was added 100 mcg/cc. of Newcol–560 as a spreader. Each agent thus prepared was sprayed to seedlings in 3 leaf age infected with *Piricularia oryzae*.

The results were shown in the following table:

| Agents sprayed | Number of enlarged lesions per 10 lieves |
|---|---|
| Kasugamycin culture filtrate | 0 |
| Kasugamycin culture filtrate diluted to 2 times | 0 |
| Kasugamycin culture filtrate diluted to 4 times | 0 |
| Kasugamycin culture filtrate diluted to 8 times | 0.9 |
| Kasugamycin culture filtrate | |

| Agents sprayed | Number of enlarged lesions per 10 lieves |
| --- | --- |
| diluted to 16 times | 3.0 |
| Control | 84.5 |

It is clear from the above table, that the present agent, even when diluted to 16 times, can inhibit the progress of infection.

EXAMPLE 2

In this example, the method (1) was adopted, a filtrate of cultured liquid of *Streptomyces kasugaensis* which contained 100 mcg/cc. of kasugamycin (the filtrate further contained about 10 mcg/cc. of aureothricin and thiolutin), an aqueous solution of extract of a culture-liquid of *Streptomyces kasugaensis* (the said extract was a powder obtained by adding an active carbon to the cultured-liquid at 0.5% and pH 2.0, removing the active carbon by filtration, neutralizing the resulting filtrate, adding thereto 2.0% of active carbon to adsorb kasugamycin, eluting the kasugamycin with 80% aqueous methanol at pH 7.0 and then concentrating the same under reduced pressure followed by drying), and an aqueous solution of kasugamycin hydrochloride were tested, respectively. The results obtained were as follows:

| Agents sprayed | | | | Curative value |
| --- | --- | --- | --- | --- |
| Filtrate, | diluted to | 2 | times | 100% |
| do. | do. | 4 | do. | do. |
| do. | do. | 16 | do. | do. |
| do. | do. | 64 | do. | 97.8% |
| Extract, | 8 | mg/cc. | | 100% |
| do. | 4 | do. | | do. |
| do. | 1 | do. | | do. |
| do. | 0.5 | do. | | 98.0% |
| do. | 0.25 | do. | | 88.5% |
| Kasugamycin | hydrochloride | 30 | mcg/cc. | 100% |
| do. | do. | 15 | do. | do. |
| do. | do. | 3.75 | do. | 98.2% |
| do | do. | 1.0 | do. | 82.2% |

EXAMPLE 3

The same agents as in example 2 were tested according to the method (2) to obtain the following results:

| Agents sprayed | | | | Protective value |
| --- | --- | --- | --- | --- |
| Filtrate, | diluted to | 2 | times | 100% |
| do. | do. | 8 | do. | do. |
| do. | do. | 16 | do. | do. |
| Extract, | 4 | mg./cc. | | do. |
| do. | 2 | do. | | 99.5% |
| do. | 1 | do. | | 93.7% |
| Kasugamycin | hydrochloride | 30 | mcg/cc. | 100% |
| do. | do. | 15 | do. | 97.8% |
| do. | do. | 7.5 | do. | 96.7% |
| do. | do. | 3.75 | do. | 89.0% |

EXAMPLE 4

To 3 g. of a crude powder of 8% purity kasugamycin extracted from a filtrate of cultured liquid of *Streptomyces kasugaensis* according to ion exchange resin process, 60 g. of sieklite, 34 g. of talc, and 2 g. of vitasil were added to form a dust formulation. The dust formulation thus prepared was dusted in an amount of 200 mg/pot. Further, wettable powder formulation was prepared by adding to 20 g. of crude powder of 8% purity kasugamycin, 75 g. of Tolite MT-S, 2 g. of Newcol–560 and 3 g. of Toyolignin CP. The formulation was diluted to 500 times with water and was then sprayed in an amount of 4 ml./pot. Each test was carried out according to the method (1) and showed the curative value within the range of from 90 to 100%.

EXAMPLE 5

Kasugamycin was mixed with mercury preparations and the resulting chemical mixtures were compared in preventive effect with individual chemicals to obtain the following results (the method (1) was adopted):

| Agents and concentration | | | Number of enlarged lesions per lief |
| --- | --- | --- | --- |
| Kasugamycin | 30 | mcg/cc. | 0 |
| do. | 15 | do. | 0.3 |
| do. | 7.5 | do. | 2.3 |
| do. | 3.75 | do. | 4.8 |
| Kasugamycin 15 mcg/cc + phenyl mercuric iodide 20 mcg/cc. | | | 0 |
| Kasugamycin 15 mcg/cc + phenyl mercuric iodide 10 mcg/cc. | | | 0.2 |
| Kasugamycin 15 mcg/cc + phenyl mercuric iodide 5 mcg/cc. | | | 2.1 |
| Kasugamycin 7.5 mcg/cc + phenyl mercuric iodide 20 mcg/cc. | | | 0 |
| Kasugamycin 7.5 mcg/cc + phenyl mercuric iodide 10 mcg/cc. | | | 0.2 |
| Kasugamycin 7.5 mcg/cc + phenyl mercuric iodide 5 mcg/cc. | | | 2.1 |
| Kasugamycin 3.75 mcg/cc + phenyl mercuric iodide 20 mcg/cc. | | | 0.1 |
| Kasugamycin 3.75 mcg/cc + phenyl mercuric iodide 10 mcg/cc. | | | 0.2 |
| Kasugamycin 3.75 mcg/cc + phenyl mercuric iodide 5 mcg/cc. | | | 2.9 |
| Phenyl mercuric iodide 40 mcg/cc | | | 16.6 |
| Phenyl mercuric iodide 20 mcg/cc | | | 20.2 |
| Phenyl mercuric iodide 10 mcg/cc | | | 20.8 |
| Phenyl mercuric iodide 5 mcg/cc | | | 18.7 |
| Kasugamycin 15 mcg/cc + phenyl mercuric acetate 10 mcg/cc. | | | 0 |
| Phenyl mercuric acetate 20 mcg/cc. | | | 19.5 |
| Control | | | 20.4 |

The above results show that the mixtures of kasugamycin with mercury preparations are not deteriorated in activity but are rather synergistic.

EXAMPLE 6

The same chemicals as in Example 5 were tested according to the method (2), i.e. *Piricularia oryzae* was inoculated to plants after the application of agents, to obtain the following results:

| Agents sprayed | Number of enlarged lesions per lief |
| --- | --- |
| Kasugamycin 15 mcg/cc. | 3.9 |
| Kasugamycin 7.5 mcg/cc. | 8.3 |
| Phenyl mercuric iodide 10 mcg/cc. | 1.1 |
| Phenyl mercuric iodide 5 mcg/cc. | 3.0 |
| Phenyl mercuric acetate 20 mcg/cc. | 3.4 |
| Kasugamycin 15 mcg/cc + phenyl mercuric iodide 10 mcg/cc. | 0 |
| Kasugamycin 15 mcg/cc + phenyl mercuric iodide 5 mcg/cc. | 0.6 |
| Kasugamycin 7.5 mcg/cc + phenyl mercuric iodide 5 mcg/cc. | 0.8 |
| Kasugamycin 15 mcg/cc + phenyl mercuric iodide 20 mcg/cc. | 0.9 |
| Control | 20.0 |

The above results show that the mixing of the two agents increases the protective effect.

EXAMPLE 7

100 mcg/cc of NNP (Newcol-560) was added as a spreader to a liquid containing kasugamycin obtained by extracting a filtrate of cultured liquid of *Streptomyces kasugaensis* with ethanol to remove aureothricin, thiolutin and a pentaene antifungal substance. The chemical thus prepared was subjected to field test. The test was carried out in the field of Agricultural Experiment Station of Hokkoh Chemical Industry Co. at Atsugi in Kanagawa Prefecture. In this field, rice plant was inoculated with diseased rice leaves in order to cause vigorous infection of *Piricularia oryzae*. Four days after the inoculation, i.e. when the appearance of diseased spots was recognized, 20 cc.per 0.6 m$^2$ of the above-mentioned kasugamycin-containing agent was sprayed. The spray was conducted 1 to 3 times. For comparison, 20 mcg/cc. of phenyl mercuric iodide and 40, 20 and 10 mcg/cc. of blasticidin S were sprayed, respectively, in an amount of 20 cc. per 0.6m$^2$ to respective plot. At 7,9,11,13,15,19 and 23rd day after the inoculation with diseased leaves, the area of lesions in each plot was calculated and the results were showed in FIGS. 1 and 2. In each graph, the vertical axis shows the percentage of diseased lesion area; the horizontal axis shows the number of days; curve A indicates a control (non-treated; curve B the results of 20 ppm. mercury chemical; curve C, 10 ppm. blasticidin S; curve D, 20 ppm. blasticidin S; curve E, 40 ppm. blasticidin S; and curve F, kasugamycin. FIG. 2 shows the results of test in which the first spray was carried on the fourth day after the inoculation, the second spray on the ninth day, and the third spray on the eleventh day. It was noticed that the rice plants treated with kasugamycin were least in the number of lesions and the growth of plants was markedly strong.

EXAMPLE 8

In this example, there were used kasugamycin hydrochloride, a crude kasugamycin of 1.5% purity and a filtrate of cultured liquid of *Streptomyces kasugaensis* containing 400 mcg/cc. of kasugamycin at 1.5 and 30 mcg/cc. of aureothricin. They were diluted to obtain solutions containing kasugamycin at concentrations of 80 mcg/cc, 40 mcg/cc, 20 mcg/cc and 10 mcg/cc, respectively. To each solution, Newcol-560 was added at 100 mcg/cc. In the same manners as in Example 7, the agents thus prepared were sprayed in the field test. For comparison, solutions of blasticidin S at concentrations of 20 mcg/cc. and 10 mcg/cc were sprayed. One month after the spray the solutions containing kasugamycin at 80 mcg/cc gave the best results and seedlings sprayed therewith grew like non-infected seedlings. Furthermore seedlings sprayed with the filtrate of cultured liquid showed stronger growth than non-infected seedlings. Among the infected seedlings, almost all of untreated seedlings were killed. Those sprayed with kasugamycin were stronger in growth than those sprayed with blasticidin S.

EXAMPLE 9

Kasugamycin hydrochloride and its mixture with aureothricin were tested according to the method (1) to obtain the following results:

| Agents sprayed | | | Number of enlarged lesions per 10 lieves |
|---|---|---|---|
| Kasugamycin | 20 | mcg/cc | 0 |
| Kasugamycin | 5 | do. | 7.4 |
| Kasugamycin | 1.25 | do. | 50.4 |
| Kasugamycin 20 mcg/cc + aureothricin 5 mcg/cc. | | | 2.7 |
| Kasugamycin 5 mcg/cc + aureothricin 5 mcg/cc. | | | 10.2 |
| Kasugamycin 1.25 mcg/cc + aureothricin 5 mcg/cc. | | | 25.6 |
| Blasticidin S 30 mcg/cc. | | | 8.4 |
| Control | | | 102.4 |

It was observed that aureothricin enhanced the actions of low concentration kasugamycin without lowering its preventive effects. That the presence of a slight amount of aureothricin or thiolutin accelerates the growth of plants was already known. This example a showed that the presence of aureothricin at the concentration causing no phytotoxicity does not interfere the effect of kasugamycin.

EXAMPLE 10

Kasugamycin hydrochloride, blasticidin S and a mixture of both in equal amounts were prepared and were tested according to the method (1) to obtain the following results:

| Agents sprayed | | | Curative value |
|---|---|---|---|
| Kasugamycin | 30 | mcg/cc | 100% |
| do. | 15 | do. | 96.5% |
| do. | 7.5 | do. | 92.1% |
| do. | 3.75 | do. | 63.0% |
| Blasticidin S | 30 | mcg/cc | 98.5% |
| do. | 20 | do. | 98.0% |
| do. | 10 | do. | 89.0% |
| Mixture | 30 | mcg/cc | 100% |
| do. | 15 | do. | 97.0% |
| do. | 7.5 | do. | 86.0% |
| do. | 3.75 | do. | 73.2% |

EXAMPLE 11

Test for examination of preventive effect in field. Method:

In a vinyl house, rice, seedlings were inoculated with the rice leaves which severely infected with *Piricularia oryzae*. Two days after the inoculation, dust and wettable powder formulations of each agent of kasugamycin, phenyl mercuric iodide and kasugamycin + phenyl mercuric iodide were sprayed one week thereafter, the same agents were again sprayed. 12, 17 and 25 days after the first spray, the areas of leaves which were killed due to *Piricularia oryzae* were investigated to obtain the following results:

| Agents and concentration | | Killed area (%) after | | |
|---|---|---|---|---|
| | | 12 days | 17 days | 25 days |
| None | | 77.9% | Completely killed | Completely killed |
| Wettable powder formulation: | | | | |
| Kasugamycin | 20 ppm. | 8.1 | 34 | 50 |
| Phenyl mercuric iodide | 20 ppm. (as Hg) | 19.7 | 58 | 80 |
| Kasugamycin + phenyl mercuric iodide | 10 ppm. 10 ppm. (as Hg) | 6.6 | 26 | 30 |
| Dust formulation: | | | | |
| Kasugamycin | 0.2% | 17.9 | 55 | 63 |
| Phenyl mercuric | 0.2% | 24.5 | 62 | 45 |

-Continued

| Agents and concentration | | Killed area (%) after | | |
|---|---|---|---|---|
| | | 12 days | 17 days | 25 days |
| iodide | (as Hg) | | | |
| Kasugamycin + phenyl mercuric iodide | 0.1% 0.1% (as Hg) | 6.6 | 24 | 30 |

The above results show that, in the preventive test in field also, the mixture of kasugamycin with mercury preparation exhibits synergistic effect.

EXAMPLE 12

Kasugamycin was mixed with alkylthiocyanates (a mixture of hexadecyl- and octadecylthiocyanate) at various concentrations and the preventive effects of the resulting mixtures were tested according to the method (1) and were compared with the effects of individual agents. Test results were as follows:

| Agents and concentration | | | Number of enlarged lesions per 10 leaves | | |
|---|---|---|---|---|---|
| | | | Plot A | Plot B | Average |
| Kasugamycin | 15 | mcg/cc | 0.2 | 0.3 | 0.3 |
| do. | 7.5 | do. | 2.1 | 2.4 | 2.3 |
| do. | 3.75 | do. | 3.5 | 6.1 | 4.8 |
| Alkylthiocyanate 1000 mcg/cc + kasugamycin 15 mcg/cc | | | 0 | 0 | 0 |
| Alkylthiocyanate 1000 mcg/cc + kasugamycin 7.5 mcg/cc. | | | 0.6 | 0.8 | 0.7 |
| Alkylthiocyanate 1000 mcg/cc + kasugamycin 3.75 mcg/cc. | | | 0.2 | 1.1 | 0.7 |
| Alkylthiocyanate 500 mcg/cc + kasugamycin 15 mcg/cc. | | | 0 | 0 | 0 |
| Alkylthiocyanate 500 mcg/cc + kasugamycin 7.5 mcg/cc. | | | 0.5 | 0.7 | 0.6 |
| Alkylthiocyanate 500 mcg/cc + kasugamycin 3.75 mcg/cc. | | | 1.8 | 2.4 | 2.1 |
| Alkylthiocyanate 1000 mcg/cc. | | | 13.7 | 19.2 | 16.5 |

Table — Continued

| | | | |
|---|---|---|---|
| Alkylthiocyanate 500 mcg/cc. | 15.1 | 20.2 | 17.7 |
| Blasticidin S 30 mcg/cc. | 0 | 0 | 0 |
| Control | 13.2 | 20.1 | 16.7 |

The above results indicate that respective curative effects of alkylthiocyanates and kasugamycin are increased when the two are used in admixture, and that the mixed agent is more effective than twice the amount of individual agent. Thus, the agents show synergistic effect when used in admixture.

EXAMPLE 13

The same agents as in example 12 were tested according to the method (2). The test results were as follows:

| Agents and concentration | | | Number of enlarged lesions per leaf | | | |
|---|---|---|---|---|---|---|
| | | | Sect.a | Sect.b | Sect.c | Average |
| Kasugamycin | 15 | mcg/cc | 2.7 | 3.9 | 4.8 | 3.7 |
| do. | 7.5 | do. | 5.0 | 4.2 | 6.4 | 5.2 |
| do. | 3.75 | do. | 8.2 | 8.7 | 10.1 | 9.0 |
| Alkylthiocyanate 100 g/cc | | | 0 | 0.17 | 0.43 | 0.20 |
| Alkylthiocyanate 50 g/cc | | | 0 | 1.50 | 2.00 | 1.00 |
| Alkylthiocyanate 100γ/cc + kasugamycin 15γ/cc | | | 0 | 0 | 0 | 0 |
| Alkylthiocyanate 100γ/cc + kasugamycin 7.5γ/cc | | | 0 | 0 | 0.03 | 0.86 |
| Alkylthiocyanate 100γ/cc + kasugamycin 3.75γ/cc | | | 0 | 0 | 0 | 0 |
| Alkylthiocyanate 50γ/cc + kasugamycin 15γ/cc | | | 0 | 0 | 0 | 0 |
| Alkylthiocyanate 50γ/cc + kasugamycin 7.5γ/cc | | | 0 | 0 | 0.29 | 0 |
| Alkylthiocyanate 50γ/cc + kasugamycin 3.75γ/cc | | | 0 | 0 | 0.59 | 0.20 |
| Control | | | 12.57 | 12.15 | 14.60 | 13.11 |

The above results indicate that the mixed agents are higher in preventive effect than twice the amount of individual agents and obviously show synergistic effects.

EXAMPLE 14

Field test I
Method

At 4 – 5 leaf age of rice seedlings "Norin No. 21" cultivated in nursery state, *Piricularia oryzae* was inoculated using diseased leaves as an inoculation source. After recognizing that the seedlings had been attacked, the same agents as in example 12 were sprayed 3 times and the diseased state of the seedlings was investigated 4 times before and after each spray.

Date of inoculation: May 10, 1964
Date of spray:
1. May 18, 1964
2. May 25, 1964
3. June 1, 1964

The results were as follows:

| Agents and concentration | | | Area of lesions(%) | | | |
|---|---|---|---|---|---|---|
| | | | May 17 | May 24 | May 31 | June 7 |
| Kasugamycin | 60 | mcg/cc | 2 | 4 | 8 | 20 |
| do. | 30 | do. | 3 | 5 | 23 | 39 |
| do. | 15 | do. | 2 | 9 | 28 | 55 |
| do. | 7.5 | do. | 4 | 12 | 46 | 80 |
| Kasugamycin 30 mcg/cc + alkylthiocyanate 1000 mcg/cc | | | 2 | 5 | 10 | 18 |
| Kasugamycin 30 mcg/cc + alkylthiocyanate 500 mcg/cc | | | 3 | 8 | 11 | 21 |
| Kasugamycin 30 mcg/cc + alkylthiocyanate 250 mcg/cc | | | 4 | 6 | 11 | 29 |
| Kasugamycin 15 mcg/cc + alkylthiocyanate 1000 mcg/cc | | | 2 | 9 | 10 | 22 |
| Kasugamycin 15 mcg/cc + alkylthiocyanate 500 mcg/cc | | | 2 | 8 | 17 | 31 |

Table — Continued

| Agents and concentration | Area of lesions(%) | | | |
|---|---|---|---|---|
| | May 17 | May 24 | May 31 | June 7 |
| Kasugamycin 15 mcg/cc + alkylthiocyanate 250 mcg/cc | 2 | 8 | 23 | 41 |
| Kasugamycin 7.5 mcg/cc + alkylthiocyanate 1000 mcg/cc | 2 | 5 | 15 | 38 |
| Kasugamycin 7.5 mcg/cc + alkylthiocyanate 500 mcg/cc | 3 | 10 | 20 | 56 |
| Kasugamycin 7.5 mcg/cc + alkylthiocyanate 250 mcg/cc | 3 | 12 | 21 | 33 |
| Alkylthiocyanate 1000 mcg/cc | 2 | 6 | 24 | 42 |
| Alkylthiocyanate 500 mcg/cc | 2 | 13 | 35 | 64 |
| Alkylthiocyanate 250 mcg/cc | 3 | 14 | 52 | 83 |
| Phenyl mercuric iodide 20 mcg/cc | 2 | 14 | 56 | 72 |
| Blasticidin 30 mcg/cc | 4 | 17 | 35 | 61 |
| Control | 2 | 28 | 74 | 95 |

Field test II

Method

In the same manners as in Field test I, rice seedlings were grown in a nursery in a green-house and diseased leaves were distributed on May 16, 1964 in the nursery to inoculate *Piricularia oryzae* to the seedlings. Two days after the inoculation, each chemical in the form of a dust formulation of kasugamycin, alkylthiocyanate (a mixture of hexadecyl- and octadecyl thiocyanate) and kasugamycin + the said alkylthiocyanate was sprayed two times, 12, 17 and 25 days after the first spray, the areas of leaves killed due to *Piricularia oryzae* were investigated. The results were as follows:

| Chemicals | Concentration | Area of killed leaves(%) after | | |
|---|---|---|---|---|
| | | 12 days | 17 days | 25 days |
| None | — | 77.9 | Completely Killed | Killed |
| Alkylthiocyanate | 4.0% | 34.5 | 60 | 85 |
| Kasugamycin | 0.2% | 27.9 | 55 | 68 |
| I Kasugamycin + alkylthiocyanate | 0.1% 2.0% | 12.1 | 27 | 41 |
| Kasugamycin | 0.1% | 39.5 | 81 | 94 |

Table — Continued

| Chemicals | Concentration | Area of killed leaves(%) after | | |
|---|---|---|---|---|
| | | 12 days | 17 days | 25 days |
| II Kasugamycin + alkylthiocyanate | 0.05% 2.0% | 14.7 | 33 | 51 |

It is clear that synergistic effect is attained by the mixing of the two agents.

What we claim is:

1. A rice blast disease preventive composition comprising an effective amount for preventing rice blast disease of kasugamycin or its addition acid salts, and a carrier.

2. The rice blast disease preventive composition of claim 1 wherein the concentration of kasugamycin ranges from 1.25 to 20 mcg/cc.

3. The rice blast disease preventive composition of claim 1 wherein the concentration of kasugamycin is 40 mcg/cc.

4. The rice blast disease preventive composition of claim 1 wherein the concentration of kasugamycin is 1 mg/cc.

* * * * *